United States Patent
Ioveva et al.

(10) Patent No.: US 10,810,277 B1
(45) Date of Patent: *Oct. 20, 2020

(54) SYSTEM AND METHOD FOR DETERMINATION OF A DIGITAL DESTINATION BASED ON A MULTI-PART IDENTIFIER

(71) Applicant: Facebook, Inc., Menlo Park, CA (US)

(72) Inventors: Maria Ioveva, Menlo Park, CA (US); Jake Bograd-Denton, San Francisco, CA (US); Laycee Berkas, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/234,101

(22) Filed: Dec. 27, 2018

Related U.S. Application Data

(63) Continuation-in-part of application No. 15/798,179, filed on Oct. 30, 2017.

(51) Int. Cl.
*G06F 16/955* (2019.01)
*G06K 7/14* (2006.01)
*G06Q 50/00* (2012.01)

(52) U.S. Cl.
CPC ...... *G06F 16/9554* (2019.01); *G06F 16/9558* (2019.01); *G06K 7/1417* (2013.01); *G06K 7/1447* (2013.01); *G06Q 50/01* (2013.01)

(58) Field of Classification Search
CPC .. G06F 16/9554; G06K 7/1417; G06K 9/344; G06K 9/6256; G06K 9/78
See application file for complete search history.

(56) References Cited

U.S. PATENT DOCUMENTS

| | | | |
|---|---|---|---|
| 7,751,805 | B2 | 7/2010 | Neven |
| 9,111,164 | B1 | 8/2015 | Anderton |
| 2006/0190812 | A1 | 8/2006 | Ellenby |
| 2010/0005156 | A1 | 1/2010 | Wesby |
| 2013/0013414 | A1 | 1/2013 | Haff |

(Continued)

FOREIGN PATENT DOCUMENTS

| | | |
|---|---|---|
| KR | 101574241 | 12/2015 |
| WO | 2014024197 | 2/2014 |

OTHER PUBLICATIONS

European Patent Application No. 18179602.0, Search Report dated Dec. 21, 2018.

(Continued)

*Primary Examiner* — Ruiping Li
(74) *Attorney, Agent, or Firm* — Sheppard Mullin Richter & Hampton LLP

(57) ABSTRACT

Systems, methods, and non-transitory computer-readable media can determine a multi-part identifier captured using one or more cameras associated with the computing device, the multi-part identifier including at least a first portion that references a site, a second portion that references an entity, and information describing one or more actions. A digital destination associated with the multi-part identifier can be determined based at least in part on the first portion and the second portion of the multi-part identifier. One or more actions to be performed in relation to the digital destination can be determined based at least in part on the information included with the multi-part identifier.

20 Claims, 11 Drawing Sheets

(56) References Cited

U.S. PATENT DOCUMENTS

| | | | |
|---|---|---|---|
| 2014/0344723 A1* | 11/2014 | Malik | G06Q 10/109 715/753 |
| 2016/0026626 A1 | 1/2016 | Beadles | |
| 2017/0060864 A1 | 3/2017 | Glover | |
| 2017/0061246 A1 | 3/2017 | Chen | |
| 2017/0293938 A1 | 10/2017 | Escher | |
| 2018/0307942 A1 | 10/2018 | Pereira | |

OTHER PUBLICATIONS

International Application No. PCT/US2017/059605, International Search Report and Written Opinion dated Jul. 30, 2018.

\* cited by examiner

250

Determine a multi-part identifier captured using one or more cameras associated with the computing device, the multi-part identifier including at least a first portion that references a site, a second portion that references an entity, and information describing one or more actions
252

Determine a digital destination associated with the multi-part identifier based at least in part on the first portion and the second portion of the multi-part identifier
254

Determine one or more actions to be performed in relation to the digital destination based at least in part on the information included with the multi-part identifier
256

FIG. 2B

SYSTEM AND METHOD FOR DETERMINATION OF A DIGITAL DESTINATION BASED ON A MULTI-PART IDENTIFIER

CROSS-REFERENCE TO RELATED APPLICATIONS

This application is a continuation-in-part of U.S. patent application Ser. No. 15/798,179, filed on Oct. 30, 2017 and entitled "SYSTEM AND METHOD FOR DETERMINATION OF A DIGITAL DESTINATION BASED ON A MULTI-PART IDENTIFIER", which is incorporated herein by reference in its entirety.

BACKGROUND

Quick response (QR) codes and other two-dimensional barcodes can be used on various mobile device operating systems. These devices support Uniform Resource Locator (URL) redirection, which allows QR codes to send metadata to existing applications on the device. Many paid or free apps are available with the ability to scan the codes and hard-link to an external URL. These codes consist of black squares arranged in a square grid on a white background, which can be read by an imaging device such as a camera. As such, a user typically has no idea which URL the QR code may redirect to upon scanning the QR code with the camera. This frustrates the process for the user and makes the user less likely to want to use the QR code for URL redirection.

The embodiments described herein solve these problems, both individually and collectively.

BRIEF SUMMARY

The embodiments described herein relate to capturing an image including an object and identifying the object within the image, the object having a multi-part identifier including a first portion and a second portion. The object can be, for example, handwritten text on a piece of paper or printed text on a poster or flyer. The first portion may include graphical content and the second portion may include human-recognizable textual content. The graphical content may be used to identify a domain and the human-recognizable textual content may be used to identify a sub-part of the domain. For example, the graphical content may include a logo of a social network service provider and the human-recognizable textual content may include a username of a of a user registered with the social network. Together, the graphical content and the human-recognizable textual content may be used to identify a digital destination and an action may be performed dependent on the identified digital destination.

For example, an action that can be taken may include, upon capturing and identifying an object including the graphical content and the human-recognizable textual content at a sunglasses store with a user device, the user device may be able to employ augmented reality (AR) effects, via the device's camera, within the store to overlay sunglasses sold by the store over the user's as previewed on a front facing camera of the device. Another example of an action that can be taken includes opening a payment application and pre-filling the recipient info for a payment based on the identified digital destination.

In some embodiments, a multi-part identifier can include a first portion, a second portion, and a third portion. In such embodiments, the first portion can correspond to graphical content while the second and third portions correspond to human-recognizable textual content. For example, the graphical content corresponding to the first portion may be a logo associated with a site or domain (e.g., a social network service). The textual content corresponding to the second portion can identify an entity (e.g., a user or page) associated with the site (e.g., social network service). Further, the textual content corresponding to the third portion can identify one or more actions (or operations) that can be performed through the site (e.g., social network service) when the multi-part identifier is scanned using a computing device. For example, the multi-part identifier can be scanned using a computing device to follow a page identified by the second portion of the multi-part identifier (e.g., the "Cooking Club" page). Other examples of actions that can be performed include adding a user as a friend through the social network service, messaging a user through the social network service, liking a page through the social network service, posting a comment in a page through the social network service, and sharing a page with other users through the social network service, to name some examples. In some embodiments, actions can be performed to access content. For example, a multi-part identifier may be associated with exclusive content (e.g., videos, augmented reality filters, face mask overlays, etc.). In this example, a user operating a computing device can scan the multi-part identifier to access the exclusive content. For example, a television show may present a multi-part identifier during its broadcast. In this example, the multi-part identifier can be scanned using a computing device to access a face mask overlay that is associated with the television show. The face mask overlay can be used to create new content that can be shared through the social network service. Many variations are possible.

The combination of the graphical content and the human-recognizable content may provide advantages over traditional QR codes. First, as mentioned above, the combination of the graphical content and the human-recognizable content provides for a 1:1 mapping of the object to a digital destination. Second, the combination of the graphical content and the human-recognizable content is generally human-readable and understandable, which can give the user of the camera some idea of the action that will be initiated based on the identified digital destination upon capturing and analyzing the object. Identification of the object can be trained by a machine learning model. More specifically, a convolutional neural network model can be trained to estimate a position and size of the graphical content and the human-recognizable content.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method, including: capturing an image of an object having a multi-part identifier displayed thereon, the multi-part identifier including a first portion and a second portion, the first portion including graphical content and the second portion including human-recognizable textual content. The method also includes based on the captured image, identifying a domain associated with the graphical content. The method also includes based on the captured image, identifying a sub-part of the domain associated with the textual content. The method also includes identifying a digital destination based on the identified domain and the identified sub-part. The method also includes performing an action based on the digital destination. Other embodiments of this aspect include corresponding computer systems, apparatus, and computer programs recorded on one or more computer storage devices, each configured to perform the actions of the methods.

Implementations may include one or more of the following features. The method where performing the action includes displaying content associated with the digital destination. The method where performing the action includes executing an application based on data stored at the digital destination. The method where identifying the sub-part of the domain associated with the textual content includes decoding the textual content. The method where identifying the domain associated with the graphical content includes providing the graphical content as an input to a machine learning model, where, in response to the input, the machine learning model outputs a class identifying the domain. The method where the machine learning model is a convolutional neural network (CNN). The method where the object includes at least one of a poster, billboard, sign, handwritten content, digital content, or receipt. Implementations of the described techniques may include hardware, a method or process, or computer software on a computer-accessible medium.

One general aspect includes a system, including: a processor; and a non-transitory computer readable medium coupled the processor, the computer readable medium including code, executable by the processor, for implementing a method including. The system also includes capturing an image of an object having a multi-part identifier displayed thereon, the multi-part identifier including a first portion and a second portion, the first portion including graphical content and the second portion including human-recognizable textual content. The system also includes based on the captured image, identifying a domain associated with the graphical content. The system also includes based on the captured image, identifying a sub-part of the domain associated with the textual content. The system also includes identifying a digital destination based on the identified domain and the identified sub-part. The system also includes performing an action based on the digital destination. Other embodiments of this aspect include corresponding computer systems, apparatus, and computer programs recorded on one or more computer storage devices, each configured to perform the actions of the methods.

Implementations may include one or more of the following features. The system where performing the action includes displaying content associated with the digital destination. The system where performing the action includes executing an application based on data stored at the digital destination. The system where identifying the sub-part of the domain associated with the textual content includes decoding the textual content. The system where identifying the domain associated with the graphical content includes providing the graphical content as an input to a machine learning model, where, in response to the input, the machine learning model outputs a class identifying the domain. The system where the machine learning model is a convolutional neural network (CNN). The system where the object includes at least one of a poster, billboard, sign, handwritten content, digital content, or receipt. Implementations of the described techniques may include hardware, a method or process, or computer software on a computer-accessible medium.

One general aspect includes one or more non-transitory computer-readable media storing computer-executable instructions that, when executed, cause one or more computing devices to, including: capture an image of an object having a multi-part identifier displayed thereon, the multi-part identifier including a first portion and a second portion, the first portion including graphical content and the second portion including human-recognizable textual content. The one or more non-transitory computer-readable media also includes based on the captured image, identify a domain associated with the graphical content. The one or more non-transitory computer-readable media also includes based on the captured image, identify a sub-part of the domain associated with the textual content. The one or more non-transitory computer-readable media also includes identify a digital destination based on the identified domain and the identified sub-part. The one or more non-transitory computer-readable media also includes perform an action based on the digital destination. Other embodiments of this aspect include corresponding computer systems, apparatus, and computer programs recorded on one or more computer storage devices, each configured to perform the actions of the methods.

Implementations may include one or more of the following features. The one or more non-transitory computer-readable media where performing the action includes at least one of displaying content associated with the digital destination or executing an application based on data stored at the digital destination. The one or more non-transitory computer-readable media where identifying the sub-part of the domain associated with the textual content includes decoding the textual content. The one or more non-transitory computer-readable media where identifying the domain associated with the graphical content includes providing the graphical content as an input to a machine learning model, where, in response to the input, the machine learning model outputs a class identifying the domain. The one or more non-transitory computer-readable media where the machine learning model is a convolutional neural network (CNN). The one or more non-transitory computer-readable media where the object includes at least one of a poster, billboard, sign, handwritten content, digital content, or receipt. Implementations of the described techniques may include hardware, a method or process, or computer software on a computer-accessible medium.

One general aspect includes a method, including: capturing an image of an object having a multi-part identifier displayed thereon, the multi-part identifier including a first portion and a second portion, the first portion including graphical content and the second portion including human-recognizable textual content. The method also includes based on the captured image, identifying a domain associated with the graphical content. The method also includes based on the captured image, identifying a sub-part of the domain associated with the textual content. The method also includes identifying a digital destination based on the identified domain and the identified sub-part. The method also includes performing an action based on the digital destination. Other embodiments of this aspect include corresponding computer systems, apparatus, and computer programs recorded on one or more computer storage devices, each configured to perform the actions of the methods.

Implementations may include one or more of the following features. The method where the textual content is completely or in parts non-static. The method may also include optionally, where the textual content is displayed on a display. The method may also include optionally, where the textual content changes before, during and/or after the image capturing. The method where performing the action includes displaying content associated with the digital destination. The method of any to 23, where performing the action includes executing an application based on data stored at the digital destination. The method of any to 24, where performing the action includes executing an application and performing input to the application based on data read from the textual content. The method of any to 25, where identifying the sub-part of the domain associated with the textual content includes decoding the textual content. The method of any to 26, where identifying the domain associated with the graphical content includes providing the graphical content as an input to a machine learning model, where, in response to the input, the machine learning model outputs a class identifying the domain. The method may also include optionally, where the machine learning model is a convolutional neural network (CNN). The method of any to 27, where the object includes at least one of a poster, billboard, sign, handwritten content, digital content, or receipt. Implementations of the described techniques may include hardware, a method or process, or computer software on a computer-accessible medium.

One general aspect includes a system, including: a processor; and a non-transitory computer readable medium coupled the processor, the computer readable medium including code, executable by the processor, for implementing a method including. The system also includes capturing an image of an object having a multi-part identifier displayed thereon, the multi-part identifier including a first portion and a second portion, the first portion including graphical content and the second portion including human-recognizable textual content. The system also includes based on the captured image, identifying a domain associated with the graphical content. The system also includes based on the captured image, identifying a sub-part of the domain associated with the textual content. The system also includes identifying a digital destination based on the identified domain and the identified sub-part. The system also includes performing an action based on the digital destination. Other embodiments of this aspect include corresponding computer systems, apparatus, and computer programs recorded on one or more computer storage devices, each configured to perform the actions of the methods.

Implementations may include one or more of the following features. The system where the textual content is completely or in parts non-static. The system may also include optionally, where the textual content is displayed on a display. The system may also include optionally, where the textual content changes before, during and/or after the image capturing. The system where performing the action includes displaying content associated with the digital destination. The system of any to 31, where performing the action includes executing an application based on data stored at the digital destination. The system of any to 32, where performing the action includes executing an application and performing input to the application based on data read from the textual content. The system of any to 33, where identifying the sub-part of the domain associated with the textual content includes decoding the textual content. The system of any to 34, where identifying the domain associated with the graphical content includes providing the graphical content as an input to a machine learning model, where, in response to the input, the machine learning model outputs a class identifying the domain. The system may also include optionally, where the machine learning model is a convolutional neural network (CNN). The system of any to 35, where the object includes at least one of a poster, billboard, sign, handwritten content, digital content, or receipt. Implementations of the described techniques may include hardware, a method or process, or computer software on a computer-accessible medium.

One general aspect includes a method, including: capturing an image of an object having a multi-part identifier displayed thereon, the multi-part identifier including a first portion and a second portion, the first portion including graphical content and the second portion including human-recognizable textual content. The method also includes based on the captured image, identifying a domain associated with the graphical content. The method also includes based on the captured image, identifying a sub-part of the domain associated with the textual content. The method also includes identifying a digital destination based on the identified domain and the identified sub-part. The method also includes performing an action based on the digital destination. Other embodiments of this aspect include corresponding computer systems, apparatus, and computer programs recorded on one or more computer storage devices, each configured to perform the actions of the methods.

Implementations may include one or more of the following features. The method where the textual content is completely or in parts non-static. The method may also include optionally, where the textual content is displayed on a display. The method may also include optionally, where the textual content changes before, during and/or after the image capturing. The method where performing the action includes displaying content associated with the digital destination. The method of any to 39, where performing the action includes executing an application based on data stored at the digital destination. The method of any to 40, where performing the action includes executing an application and performing input to the application based on data read from the textual content. The method of any to 41, where identifying the sub-part of the domain associated with the textual content includes decoding the textual content. The method of any to 42, where identifying the domain associated with the graphical content includes providing the graphical content as an input to a machine learning model, where, in response to the input, the machine learning model outputs a class identifying the domain. The method may also include optionally, where the machine learning model is a convolutional neural network (CNN). The method of any to 43, where the object includes at least one of a poster, billboard, sign, handwritten content, digital content, or receipt. Implementations of the described techniques may include hardware, a method or process, or computer software on a computer-accessible medium.

Various embodiments of the present disclosure can include systems, methods, and non-transitory computer readable media configured to determine a multi-part identifier captured using one or more cameras associated with the computing device, the multi-part identifier including at least a first portion that references a site, a second portion that references an entity, and information describing one or more actions. A digital destination associated with the multi-part identifier can be determined based at least in part on the first portion and the second portion of the multi-part identifier. One or more actions to be performed in relation to the digital destination can be determined based at least in part on the information included with the multi-part identifier.

In an embodiment, the entity corresponds to a user of a social network service, a page accessible through the social network service, or content published through the social network service.

In an embodiment, determining the one or more actions to be performed in relation to the digital destination further includes determining a third portion of the multi-part identifier, the third portion identifying the one or more actions to be performed.

In an embodiment, determining the one or more actions to be performed in relation to the digital destination further includes determining a color pattern applied to the second portion of the multi-part identifier, wherein the particular color pattern is associated with one or more actions.

In an embodiment, the one or more actions include at least one of: following the entity through a social network service, adding the entity as a friend through the social network service, messaging the entity through the social network service, liking the entity through the social network service, posting a comment through the social network service, and sharing content through the social network service.

In an embodiment, determining the digital destination further includes determining the site based at least in part on the first portion of the multi-part identifier and determining the entity based at least in part on the second portion of the multi-part identifier.

In an embodiment, the first portion of the multi-part identifier corresponds to graphical content.

In an embodiment, the second portion of the multi-part identifier corresponds to human-recognizable textual content.

In an embodiment, a username associated with the entity is split into at least a first part and a second part, and wherein the split username is provided in the second portion of the multi-part identifier.

In an embodiment, the username is split based on one or more rules for presenting human-recognizable usernames.

BRIEF DESCRIPTION OF THE DRAWINGS

Aspects of the disclosure are illustrated by way of example. In the accompanying figures, like reference numbers indicate similar elements.

FIG. 2B is a flowchart illustrating another exemplary method for identifying a digital destination and performing an action based on the digital destination.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
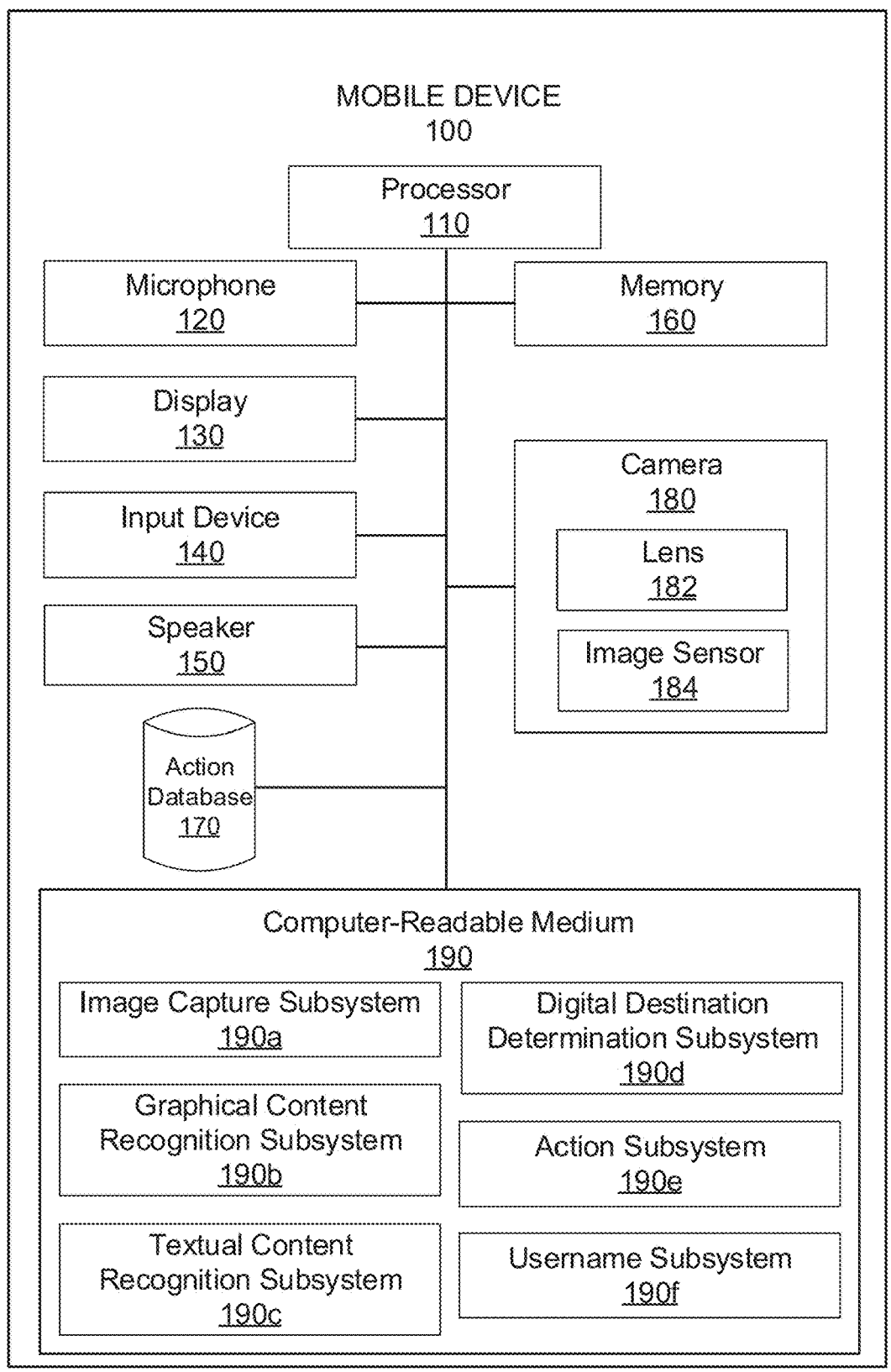
FIG. 1 illustrates a simplified diagram of a mobile device, according to some embodiments.

FIG. 1 illustrates a simplified diagram of a mobile device 100 that may incorporate one or more embodiments. Mobile device 100 may include a processor 110, microphone 120, display 130, input device 140, speaker 150, memory 160, action database 170, camera 180, and computer-readable medium 190.

Processor 110 may be any general-purpose processor operable to carry out instructions on the mobile device 100. The processor 110 is coupled to other units of the device 100 including microphone 120, display 130, input device 140, speaker 150, memory 160, action database 170, camera 180, and computer-readable medium 190.

Microphone 120 may be any device that converts a sound input to an electrical signal. The microphone 120 may capture a user's voice or any other sound in a proximity to the mobile device 100.

Display 130 may be any device that displays information to a user. Examples may include an LCD screen, CRT monitor, or seven-segment display. In some embodiments, display 130 may be a touchscreen display capable of receiving input for interaction with a camera application executing on the device 100.

Input device 140 may be any device that accepts input from a user. Examples may include a keyboard, keypad, mouse, or touch input. In some embodiments, display 130 may also function as input device 140.

Speaker 150 may be any device that outputs sound to a user. Examples may include a built-in speaker or any other device that produces sound in response to an electrical audio signal.

Memory 160 may be any magnetic, electronic, or optical memory. An example of memory 160 may be dynamic random access memory (DRAM).

Action database 170 may store information pertaining to one or more actions that can be performed by the processor 110 in response to identifying a digital destination based on an identified domain and identified sub-part(s) from graphical content and textual content, respectively, that is captured in an image.

Camera 180 may be configured to capture one or more images via a lens 182 located on the body of mobile device 100. The lens 182 may be a part of the camera 180 subsystem. The captured images may be still images or video images. The camera 180 may include a CMOS image sensor to capture the images. Various applications running on processor 110 may have access to camera 180 to capture images. It can be appreciated that camera 180 can continuously capture images without the images actually being stored within device 100. Captured images may also be referred to as image frames.

Camera 180 may also include image sensor 184. Image sensor 184 may be a sensor that detects and conveys information that constitutes an image. It may do so by converting the variable attenuation of light waves (as they pass through or reflect off objects) into signals, small bursts of current that convey the information. The waves can be light or other electromagnetic radiation. Image sensors are used in electronic imaging devices of both analog and digital types. For example, when open, lens 182 may allow light to shine through to the image sensor 184. Image sensor 184 may capture the light through the lens 182 and convert the light to an electronic signal that represents the image.

Computer-readable medium 190 may be any magnetic, electronic, optical, or other computer-readable storage medium. Computer-readable storage medium 190 may store computer-readable code comprising code subsystems, including image capture subsystem 190*a*, graphical content recognition subsystem 190*b*, textual content recognition subsystem 190*c*, digital destination determination subsystem 190*d*, action subsystem 190*e*, and username subsystem 190*f*.

Image capture subsystem 190*a*, contains code that, when executed by processor 110, may capture an image using the lens 182 and image sensor 184 of the camera 180 on the mobile device 100. The captured image may be of a field-of-view of the camera 180 positioned behind the rear of an outer body of the mobile device 100. The image capture subsystem 190*a* may be executed by the processor 110 when, for example, a user launches a camera application on the mobile device 100. The image capture subsystem 190*a* may capture a frame or multiple frames in real-time of the field-of-view of the camera 180. In some embodiments, the field-of-view of the camera 180 may include one or more objects having a multi-part identifier displayed thereon. The multi-part identifier may include a first portion and a second the portion, the first portion including graphical content and the second portion including human-recognizable textual content. In some embodiments, a multi-part identifier may include a first portion, a second portion, and a third portion. In such embodiments, the first portion can correspond to graphical content while the second and third portions correspond to human-recognizable textual content. For example, the graphical content corresponding to the first portion may be a logo associated with a site (e.g., a social network service). The textual content corresponding to the second portion can identify an entity (e.g., a user or page) associated with the site (e.g., social network service). Further, the textual content corresponding to the third portion can identify one or more actions (or operations) that can be performed through the site (e.g., social network service) when the multi-part identifier is scanned using a computing device (e.g., the mobile device 100).

Graphical content recognition subsystem 190*b* contains code that, when executed by processor 110, may analyze an object within the image captured by the image capture subsystem 190*a*. The graphical content recognition subsystem 190*b* may analyze the object to locate and identify graphical content that is part of a multi-part identifier displayed on the object. The graphical content may be located and identified by employing a machine learning model that has been trained using various images of graphical content having different shapes, sizes, and fonts. For example, the graphical content may be a logo associated with a social network service, such as the letter "f". In some embodiments, the logo may be qualified as identifiable graphical content by annotating the logo. For example, the "f" logo may be qualified by brackets around the letter, such as "[f]". The machine learning model may receive as an input the image captured by image capture subsystem 190*a* and may output a class (or classification) identifying whether an object in an image contains graphical content that is part of a multi-part identifier. The graphical content recognition subsystem 190*b* may output the identified graphical content to the digital destination determination subsystem 190*d*.

Textual content recognition subsystem 190*c* contains code that, when executed by processor 110, may analyze the object within the image captured by the image capture subsystem 190*a*. The textual content recognition subsystem 190*c* may analyze the object to locate and identify textual content that is part of the multi-part identifier displayed on the object. The textual content may be located and identified by employing the machine learning model described above or by using an algorithm that parses or decodes the textual content to identify the characters of the of the textual content using optical character recognition (OCR). For example, the textual content may be text that reads "Liam_Neeson". The textual content recognition subsystem 190*c* may identify the characters in the text "Liam_Neeson" and provide the characters of the textual content to the digital destination determination subsystem 190*d*. In some embodiments, the textual content may be completely or in parts non-static. The textual content may be, for example, displayed on a display. In some embodiments, the textual content may change before, during, and/or after the image is captured. For example, the textual content may be a price displayed on a cash register display, the display may change each time an additional item is added to the subtotal or after sales tax is added to the subtotal. In some embodiments, the multi-part identifier may include multiple textual portions. For example, the multi-part identifier may include a first portion corresponding to graphical content, textual content corresponding to a second portion, and different textual content corresponding to a third portion of the multi-part identifier. The textual content corresponding to the second portion can identify an entity, such as a page that relates to some topic (e.g., "Hiking Group"), which is published and accessible through a social network service. Further, the textual content corresponding to the third portion can identify one or more actions (or operations) that can be performed through the social network service in relation to the identified entity when the multi-part identifier is scanned using a computing device. For example, the textual content can be human-recognizable content which indicates that the multi-part identifier can be scanned to follow the page identified by the second portion of the multi-part identifier (e.g., the "Hiking Group" page). The textual content recognition subsystem 190*c* can evaluate the third portion of the multi-part identifier to determine which actions are to be performed in response to a computing device scanning the multi-part identifier. In some embodiments, the textual content recognition subsystem 190*c* determines actions to be performed based on keywords included in the third portion (e.g., "follow", "add friend", "message", "like", "comment", "share", etc.). Other examples of actions that can be performed in relation to an identified entity (e.g., a user or page) include adding an entity as a friend through the social network service, messaging an entity through the social network service, liking content through the social network service, posting a comment through the social network service, and sharing content with other users through the social network service, to name some examples. In such embodiments, the textual content recognition subsystem 190*c* can determine respective the textual content for the second portion and the third portion. The textual content recognition subsystem 190*c* can then provide information describing the textual content to the digital destination determination subsystem 190*d* for further processing.

The digital destination determination subsystem 190d contains code that, when executed by processor 110, identifies a domain based on the graphical content output by the graphical content recognition subsystem 190b and identifies a sub-part of the domain based on the textual content output by the textual content recognition subsystem 190c. For example, the digital destination determination subsystem 190d may identify a specific domain that is associated with the identified graphical content. For example, if the graphical content portrays an "[f]", the digital destination determination subsystem 190d model may identify that the domain associated with this graphical content is Facebook. In some embodiments, the identification of the domain based on the graphical content may be accomplished by querying a database of stored domains associated with different related graphical contents. In some embodiments, the identification of the sub-part of the domain based on the textual content may be based on the characters of the textual content output by the textual content recognition subsystem 190c. For example, the digital destination determination subsystem 190d may identify the domain as Facebook, based on the graphical content, and the sub-part of the domain as "Liam_Neeson" based on the textual content.

Upon identifying the domain and sub-domain, the digital destination determination subsystem 190d may identify or determine a digital destination based on the identified domain and identified sub-part of the domain. The combination of the domain and the sub-part of the domain may both make up the digital destination. For example, if the domain is a domain for a social network service, such as the IT example provided above, and the sub-part of the domain is a user profile address within the social network service, such as "Liam_Neeson," the digital destination may be the profile page of the user "Liam_Neeson." In another example, if the domain is a domain for a payment service, and the sub-part of the domain is a username for a user registered on the payment service, the digital destination may be payment profile for the registered user. In yet another example, if the domain is a domain for mobile application store, and the sub-part of the domain is a name of a virtual game, the digital destination may be a download page for the virtual game on the mobile application store. These are just a few examples of digital domains, in addition to further examples described below.

In some embodiments, the combination of the domain and the sub-part of the domain may be used for URL schemes for inter-app communications. For example, the domain may be a domain for a third-party application that executes on the mobile device. The sub-part of the domain may be a particular URL accessible by the third-party application. Accordingly, the digital destination may be the URL opened by the third-party application.

As mentioned, in some embodiments, a multi-part identifier may include graphical content and multiple text portions. For example, the multi-part identifier may include a first portion, a second portion, and a third portion. The first portion can correspond to graphical content while the second and third portions correspond to human-recognizable textual content. In this example, if graphical content portrays an "IG" logo, the digital destination determination subsystem 190d can identify that the domain associated with this graphical content is a social network service (e.g., Instagram). The digital destination determination subsystem 190d can also identify any sub-parts of the domain based on textual content outputted by the textual content recognition subsystem 190c. For example, the textual content corresponding to the second portion can identify an entity (e.g., a user or a page accessible through the social network service) and the textual content corresponding to the third portion can identify an action (or operation) that will be performed in relation to the entity when the multi-part identifier is scanned using a computing device (e.g., the mobile device 100). For example, the textual content for the third portion may be human-recognizable text which informs users of one or more actions that will be performed through the social network service upon scanning the multi-part identifier. Upon identifying the domain and sub-parts of the domain, the digital destination determination subsystem 190d may identify or determine a digital destination based on the identified domain and identified sub-parts of the domain. The combination of the domain and the sub-parts of the domain may make up the digital destination, as illustrated in the example of FIG. 4E.

In various embodiments, a multi-part identifier may apply color patterns to encode information for interacting with a given entity. For example, the multi-part identifier may include a first portion and a second portion. The first portion can be graphical content that identifies a site or domain (e.g., social network service). The second portion can include human-recognizable textual content referencing an entity (e.g., a user, a page, etc.). The textual content corresponding to the second portion can include color patterns that encode information for interacting with the entity. In some embodiments, a multi-part identifier can include textual content shown in a certain color pattern to cause pre-defined actions (or operations) to be performed when the multi-part identifier scanned using a computing device. For example, textual content that identifies an entity (e.g., "Tito's Cola") can be presented in a particular color pattern which can be scanned to follow the entity in the social network service. The combination of the domain, the textual content identifying the entity, and the color pattern may make up the digital destination, as illustrated in the example of FIG. 4F. In another example, the same textual content that identifies the entity (e.g., "Tito's Cola") can be associated with a different color pattern that can be scanned to perform a different pre-defined action (or operation).

The action subsystem 190e contains code that, when executed by processor 110, performs an action based on the digital destination. In some embodiments, performing the action may include displaying content associated with the digital destination or executing an application based on data stored at the digital destination. In some embodiments, the action subsystem 190e may query the action database 170 in order to determine the appropriate action to perform based on the digital destination. The action database 170 may store a list of actions that can be performed dependent on various domains and various sub-parts of the domain. Referencing the examples above, if the domain is a domain for a social network service, and the sub-part of the domain is a user profile address within the social network service, the action subsystem 190e may launch a web browser or mobile application for the social network service and direct the web browser or mobile application to the profile page of the user. In another example, if the domain is a domain for a payment service, and the sub-part of the domain is a username for a user registered on the payment service, the action subsystem 190e may launch a payment application local to the mobile device 100 and pre-fill payment information pertaining to the user registered on the payment service and a payment amount. In another example, if the domain is a domain for mobile application store, and the sub-part of the domain is a name of a virtual game, the action subsystem 190e may launch an application for the mobile application store and direct the application to the download page for the virtual game. In yet another example, if a multi-part identifier is associated one or more actions (or operations) to be performed through the social network service, the action subsystem 190e may launch a software application for accessing the social network service (e.g., web browser, social networking application) and can direct the software application to perform the one or more actions. In some instances, the actions may or may not be performed based on access permissions associated with a user account. For example, a multi-part identifier for messaging a first user through the social network service can be provided. A second user operating a computing device may scan the multi-part identifier to message the first user. In this example, the social network service can determine whether the second user has sufficient access permissions to message the first user. For example, the social network service can determine whether the first user and the second user are recognized as "friends" by the social network service before permitting the second user to message the first user. Many variations are possible.

In some embodiments, performing the action includes executing an application and performing input to the application based on data read from the textual content. For example, the textual content, together with the domain, may be indicative of a digital destination pertaining to a retailer's checkout page within a third-party payment application. Performing the action may include launching the third-party application on the mobile device and directing the application to the retailer's checkout page.

The username subsystem 190f can be configured to split (or line break) usernames into multiple parts. For example, in some instances, it can be difficult to display long usernames in multi-part identifiers. In various embodiments, the username subsystem 190f can split long usernames having at least a threshold number of characters (e.g., more than 10 characters) into multiple parts. For example, a username can be split into multiple parts and each part can be presented across multiple lines. For example, a username "titostacos" can be split into a first part "tito's" and second part "tacos". The username subsystem 190f can split usernames based on application of one or more rules. In some embodiments, the rules may instruct splitting a username into a first part and a second part based on word matches. For example, a username "grandhotel" may be split into a first part "grand" and a second part "hotel" upon recognizing "grand" and "hotel" as separate words. In some embodiments, the username subsystem 190f can split a username into multiple parts based on word matches and a maximum part length. For example, assuming a maximum part length of 10 characters, the username subsystem 190f may split a username "grandtokyohotel" into a first part "grand" and a second part "tokyohotel". In contrast, if the maximum part length restriction is 5 characters, the username subsystem 190f may split the username "grandtokyohotel" into a first part "grand", a second part "tokyo", and a third part "hotel". Many variations are possible.

In some embodiments, the functionality of the graphical content recognition subsystem 190b, textual content recognition subsystem 190c, digital destination determination subsystem 190d, and username subsystem 190f may be implemented on a server computer communicatively coupled to the mobile device 100. Upon capturing an image, via the image capture subsystem 190a, the mobile device 100 may transmit via a transceiver (not shown) the captured image for processing and analysis to the server computer. The server computer may identify the graphical content and textual content within the image, and determine a digital destination based thereon. The server computer may return identity of the digital destination to the mobile device 100, and the action subsystem 190e may perform an appropriate action on the digital destination.

The embodiments described above provide numerous advantages over traditional QR codes or bar codes. By recognizing graphical content instead of a binary grid of squares, a user performing the image capture may have a better understanding of the general action that may be performed on the digital destination. For example, if the graphical content is an "[f]", as illustrated in the examples above, the user performing the image capture may have a general idea that the digital destination may be within the Facebook domain. Additionally, by using a classifier to identify the domain associated with the graphical content, the graphical content does not need to be a perfect reproduced each time it is printed or drawn on an object. Variations in the printing or drawing of the graphical content may be accounted for by using the machine learning model which may still be able to identify the domain associated with the graphical content, even though the graphical content may vary on different objects. In contrast, traditional QR codes or bar codes require square or location in the binary grid to be properly captured and decoded to function properly. Further, as described above, the embodiments described herein are capable of identifying a domain that is associated with handwritten or drawn of graphical content.

In some embodiments, the graphical content may act as an anchor for the identification of the digital destination and the textual content may not be inherently static. For example, the textual content may be time-based and change over time, such as a one-time password or a token or URL.

Figure 2A:
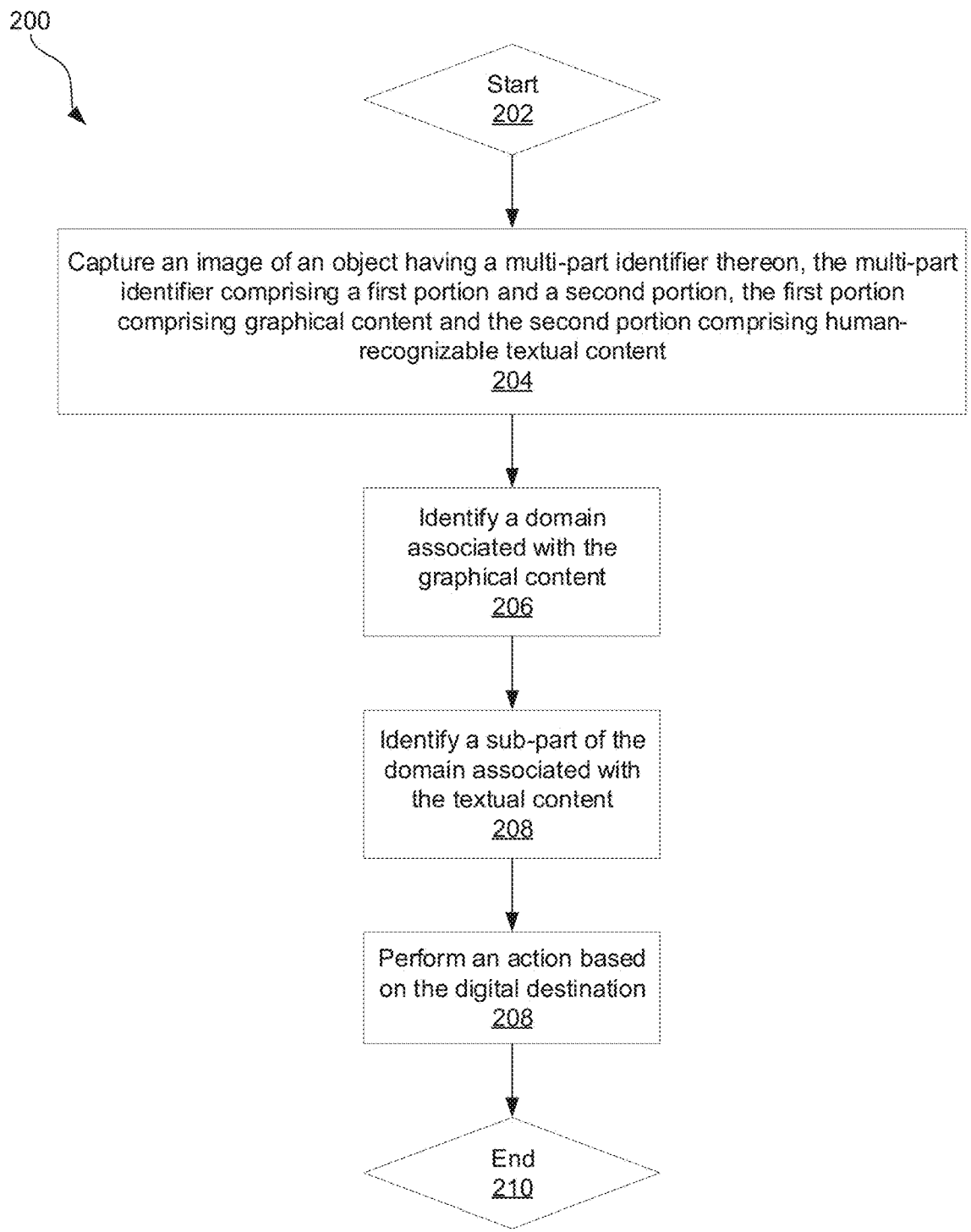
FIG. 2A is a flowchart illustrating an exemplary method for identifying a digital destination and performing an action based on the digital destination.

FIG. 2A is a flowchart 200 illustrating an exemplary method for identifying a digital destination and performing an action based on the digital destination. The method begins at step 202, for example, when a user launches a camera application or other application on the mobile device 100 that has an embedded camera function. At step 204, an image or continuous series of images is captured by the application and via a camera of a mobile device. For example, the image capture subsystem 190a may capture a frame or multiple frames in real-time of a field-of-view of the camera 180. The image may include an object having a multi-part identifier. For example, the object may be a poster, billboard, sign, a piece of paper, digital content on a display, or a receipt. The multi-part identifier may include a first portion and a second portion. The first portion of the multi-part identifier may include graphical content and the second portion of the multi-part identifier may include human-recognizable textual content.

For example, the multi-part identifier may read "*sN*john.smith", where "sN" is the first portion and "john.smith" is the second portion. The "sN" may be graphically printed or written on the object. For example, the "sN" may be a stylized logo of a social network service. The second portion, "john.smith", may be human-recognizable textual content that is hand-written or printed using a standardized font.

At step 206, after the image or continuous series of images is captured by the application via the camera of the mobile device, a domain associated with the graphical content may be identified. For example, the graphical content recognition subsystem 190b may analyze the object to locate and identify graphical content that is part of a multi-part identifier displayed on the object. The graphical content may be located and identified by employing a machine learning model that has been trained using various images of graphical content having different shapes, sizes, and fonts. In some embodiments the machine learning model may be a convolutional neural network (CNN). For example, the graphical content may be a logo associated with a social network service, such as the "*sN*". In some embodiments, the logo may be qualified as identifiable graphical content by annotating the logo. For example, the "sN" logo may be qualified by stars around the letter, such as "*sN*". The machine learning model may receive as an input the image captured by image capture subsystem 190a and may output a class identifying whether an object in an image contains graphical content that is part of a multi-part identifier.

At step 208, after the domain associated with the graphical content is identified, a sub-part of the domain associated with the textual content may be identified. For example, the textual content recognition subsystem 190c may analyze the object to locate and identify textual content that is part of the multi-part identifier displayed on the object. The textual content may be located and identified by employing the machine learning model described above or by using an algorithm that parses or decodes the textual content to identify the characters of the of the textual content using optical character recognition (OCR). For example, as described above, the textual content may be text that reads "john.smith". The textual content recognition subsystem 190c may identify the characters in the text "john.smith" and provide the characters of the textual content to the digital destination determination subsystem 190d.

At step 210, after the sub-part of the domain associated with the textual content is identified, an action may be performed based on the digital destination. In some embodiments, performing the action may include displaying content associated with the digital destination or executing an application based on data stored at the digital destination. For example, the action subsystem 190e may query the action database 170 in order to determine the appropriate action to perform based on the digital destination. Some examples of actions that may be performed based on the digital destination are described above with respect to the description of the action subsystem 190e.

FIG. 2B illustrates an example process 250, according to various embodiments of the present disclosure. It should be appreciated that there can be additional, fewer, or alternative steps performed in similar or alternative orders, or in parallel, within the scope of the various embodiments discussed herein unless otherwise stated.

At block 252, a multi-part identifier captured using one or more cameras associated with the computing device can be determined. The multi-part identifier includes at least a first portion that references a site, a second portion that references an entity, and information describing one or more actions. At block 254, a digital destination associated with the multi-part identifier can be determined based at least in part on the first portion and the second portion of the multi-part identifier. At block 256, one or more actions to be performed in relation to the digital destination can be determined based at least in part on the information included with the multi-part identifier.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Figure 3:
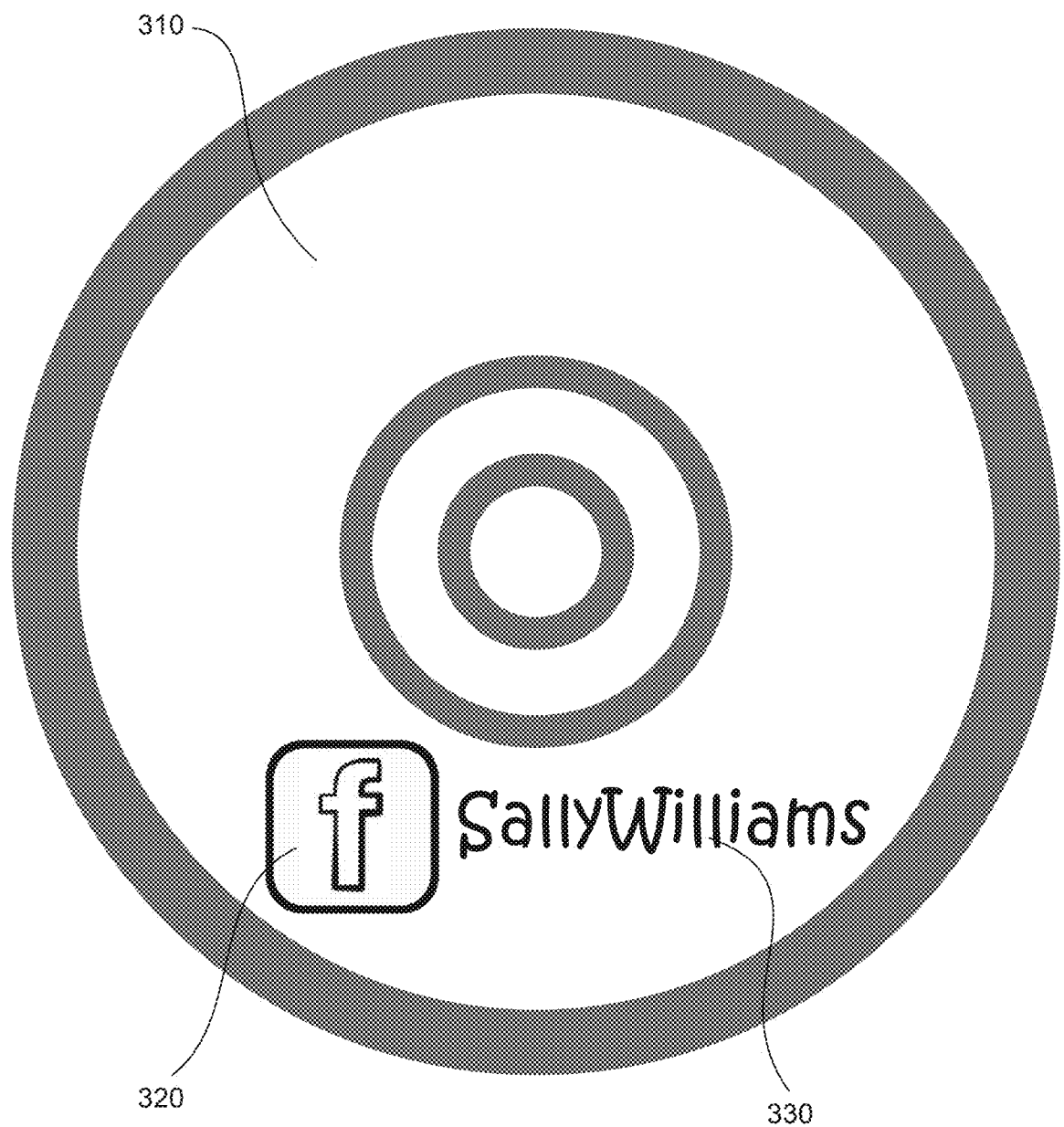
FIG. 3 illustrates an exemplary object having a multi-part identifier displayed thereon, according to some embodiments.

FIG. 3 illustrates an exemplary object 310 having a multi-part identifier displayed thereon, according to some embodiments. In this example, the object 310 is a compact disc (CD). The object 310 has a multi-part identifier displayed thereon which includes a first portion 320 including graphical content and a second portion 330 including human-recognizable textual content. The first portion 320 includes graphical content in the form of a logo, shown as "f". The logo may be a logo associated with a social network service. The logo may be, for example, printed on the object 310, handwritten on the object 310, a sticker placed on the object 310, etc. Additionally, the square that encapsulates the "f" may serve as a qualifier for the graphical content, as described above.

The second portion includes human-recognizable textual content that reads "SallyWilliams". Again, the human-recognizable textual content may be, for example, printed on the object 310, handwritten on the object 310, a sticker placed on the object 310, etc.

As described above, an image may be captured of the object 310 via a camera application on the mobile device 100. The captured image may be analyzed to identify a domain based on the graphical content of the first portion 320. For example, the graphical content recognition subsystem 190b may analyze the object 310 to locate and identify graphical content that is part of the first portion 320, using the classifier described in the examples above. Additionally, the captured image may also be analyzed to identify a sub-part of the domain that is based on the human-recognizable textual content of the second portion 330. For example, the textual content recognition subsystem 190c may analyze the object to locate and identify textual content that is part of the multi-part identifier displayed on the object using character parsing or decoding, described above.

In an illustrative example, a user may purchase the CD which stores music by a particular artist, with the multi-part identifier displayed thereon. The second user may, at his/her convenience, play the media stored on the CD and become intrigued with the artist and wish to learn more about the artist. The multi-part identifier may represent a link to the artist's profile page within the social network service. The user may open a camera application on his/her mobile device and capture an image or a series of images the CD. The image(s) may be analyzed by the graphical content recognition subsystem 190b and the textual content recognition subsystem 190c to determine the domain and sub-part of the domain, in accordance with the examples above. For example, the domain may be identified as the social network service, affiliated with the logo "f" and the sub-part of the domain may be identified as "SallyWilliams." Upon identifying the domain and sub-part of the domain, a digital destination may be identified based on the domain and sub-part of the domain by the digital destination determination subsystem 190d. For example, the digital destination may be identified as Sally William's profile page within the social network service affiliated with the logo "f". The action subsystem 190e may then determine and perform an action based on the digital destination. For example, the action subsystem 190e may associate anything identified within the "f" domain to be opened by a social network service application associated with the social network service. As a result, the action subsystem 190e may launch the social network service application on the mobile device 100 and direct the social network service application to the profile page for Sally William. Alternatively, if the social network service application is not installed on the mobile device 100, the action subsystem 190e may instead launch a web browser application and direct the web browser application to a URL within the domain of the social network service that hosts Sally William's profile page.

Figure 4A:
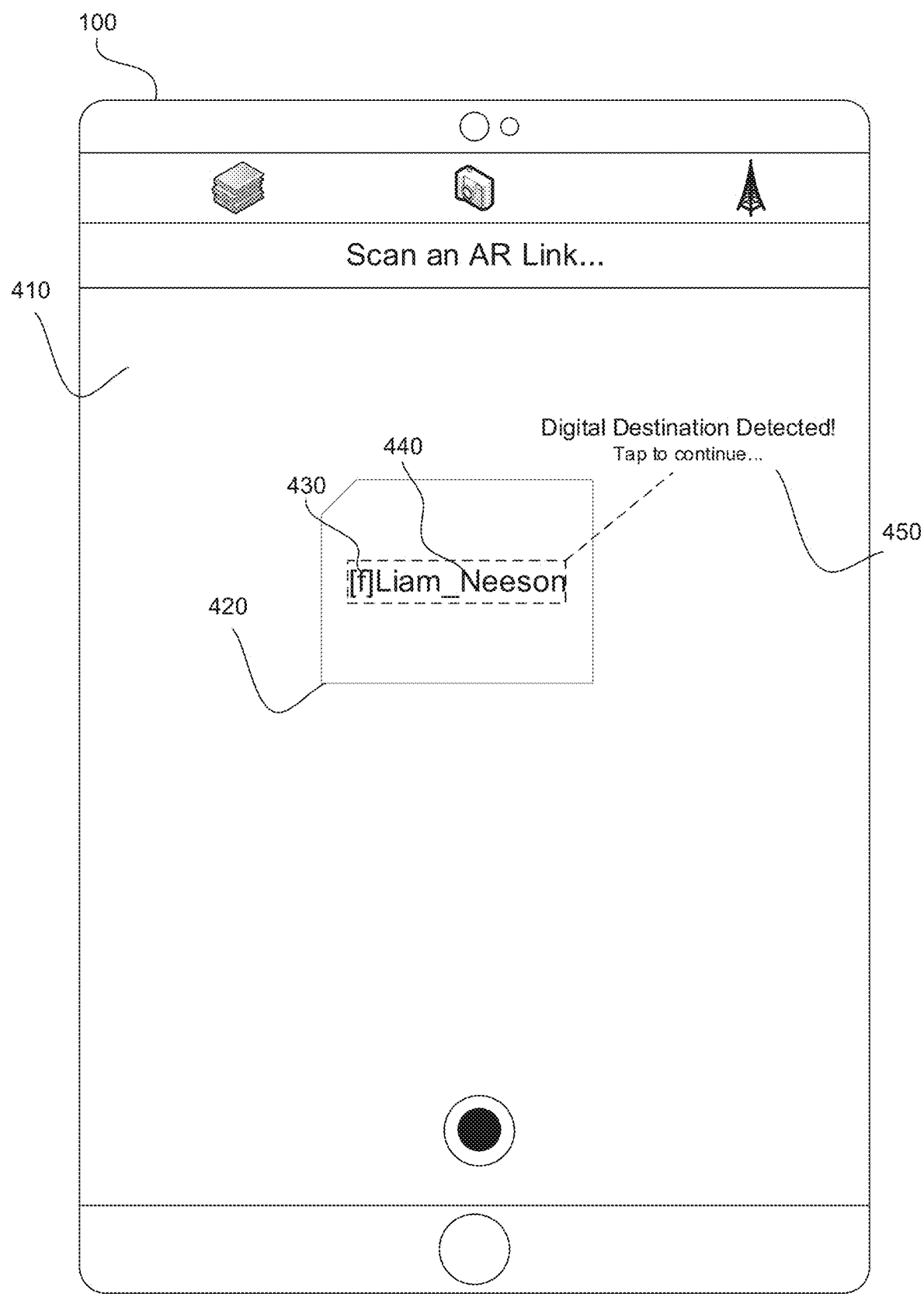
FIG. 4A illustrates a mobile device capturing an image of an object, according to some embodiments.

FIG. 4A illustrates a mobile device 100 capturing an image of an object 420, according to some embodiments. In this example, the object 420 may be a business card with a multi-part identifier thereon. The object 420 has a multi-part identifier displayed thereon which includes a first portion 430 including graphical content and a second portion 440 including human-recognizable textual content. The first portion 430 includes graphical content in the form of a logo, shown as "f". The logo may be a logo associated with a social network service. The logo may be, for example, printed on the object 420, handwritten on the object 420, a sticker placed on the object 420, etc. Additionally, the brackets that surround the "f" may serve as a qualifier for the graphical content, as described above.

The second portion includes human-recognizable textual content that reads "Liam_Neeson". Again, the human-recognizable textual content may be, for example, printed on the object 420, handwritten on the object 420, a sticker placed on the object 420, etc.

In an illustrative example, and similar to description with respect to FIG. 3, a user may be given the business card by an acquaintance. At some point, the user may wish to learn more about the acquaintance and visit the acquaintance's profile within the social network service. The user may have an idea that scanning the multi-part identifier with the camera of the mobile device 100 may result in the mobile device 100 launching a social network service application and directing the application to Liam_Neeson's profile within the social network service, because of the graphical content that may be a well-known logo affiliated with the social network service. The user may open a camera application on the mobile device 100 and be presented with a preview of the field-of-view of the camera shown within a user interface 410 displayed on the display of the mobile device 100.

The user may hover the mobile device 100 over the business card such that the business card is captured within the preview shown within the user interface 410. Upon the graphical content recognition subsystem 190b and the textual content recognition subsystem 190c identifying the graphical content and textual content of the multi-part identifier, an overlay encapsulating the multi-part identifier may be presented within the user interface 410. For example, the overlay may be a rectangle with dashed lines that encapsulates the multi-part identifier. The overlay may provide the user with confirmation that the multi-part identifier was correctly recognized by the subsystems and the user interface 410. Additionally, upon the graphical content recognition subsystem 190b and the textual content recognition subsystem 190c identifying the graphical content and textual content of the multi-part identifier, the digital destination determination subsystem 190d may determine a digital destination based on the identified graphical content and textual content. Upon determining the digital destination based on the identified graphical content and textual content, the user interface 410 may present a notification 450 to the user that indicates that a digital destination was determined. For example, the notification 450 may be a pop-up notification within the user interface that reads "Digital Destination Detected! Tap to continue . . . " The user may be able to interact with the notification 450 by providing an input gesture, such as a tap, to select the notification 450.

Figure 4B:
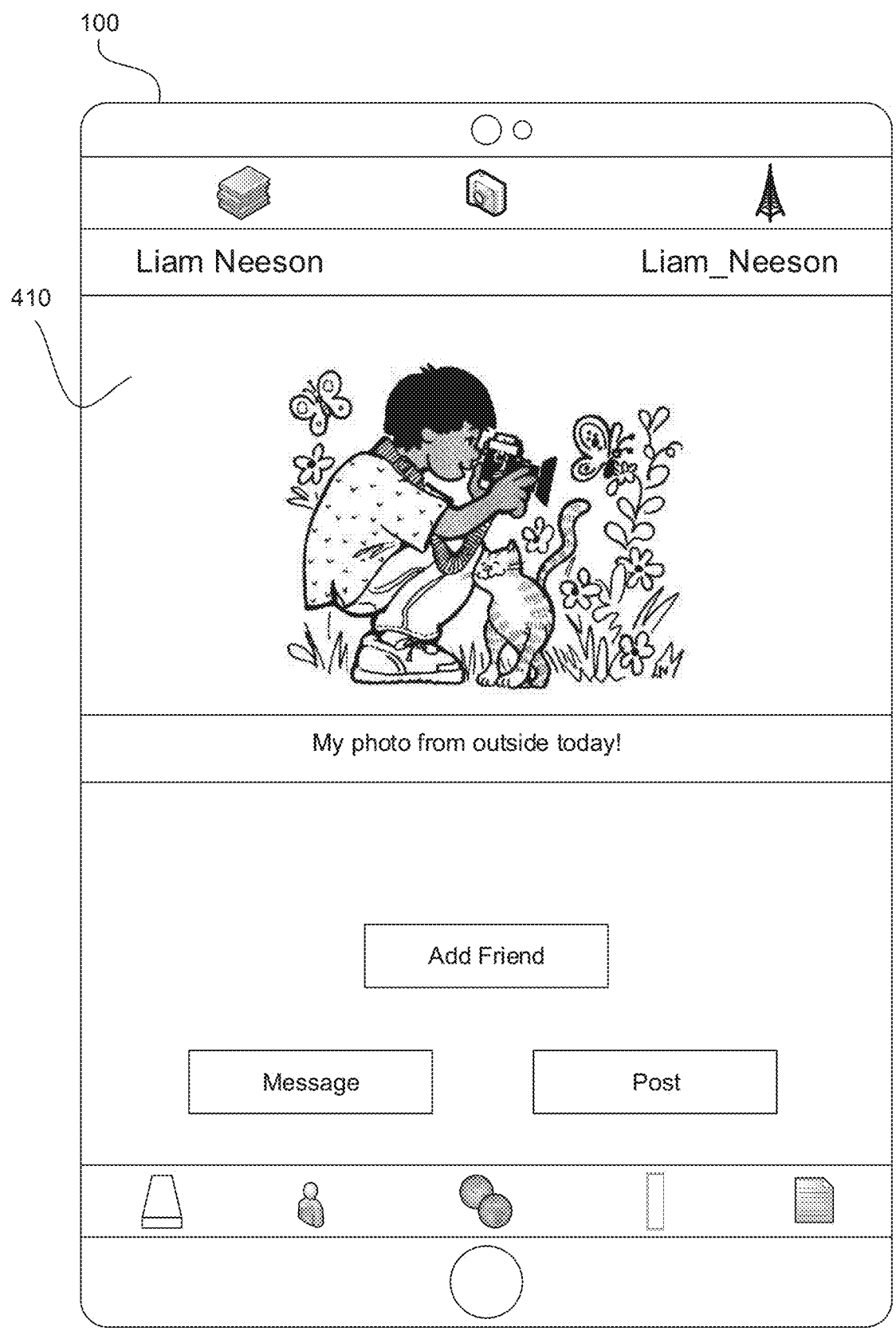
FIG. 4B illustrates a social network service application displayed on a mobile device, according to some embodiments.

Upon interacting with the notification 450, the action subsystem 190e may perform the appropriate action on the digital destination. For example, as illustrated in FIG. 4B, the action subsystem 190e may determine that the action to be performed on the digital destination is to open up the social network service application running on the mobile device 100 and direct the social network service application to display the profile page of Liam_Neeson. The profile page may be displayed within the social network service application, within the user interface 410 displayed on a display of the mobile device 100. The entire process from scanning the multi-part identifier on the object 420 with the camera of the mobile device 100 up to the user being able to view the profile page within the social network service application may be done in less than a few seconds.

As illustrated, the multi-part identifier can be both useful for individuals to use and fun for individuals to interact with. The embodiments described herein can be employed for many use cases. For examples, two strangers may meet at a bar and get along with one another. They may wish to become friends on a social network service. Each of the individuals may scribble down on a napkin a simple logo of the social network service followed by their username on the social network service. For example, one of the individuals may scribble down "[f]jason17". The next day, for example, the other individual may scan the scribbled down text on the napkin with the camera on the mobile device 100 and be presented with jason17's social network service profile shown on the mobile device 100. In another example, an individual may wish to purchase an item from a seller who does not have a point-of-sale (PoS) terminal. Instead, the seller may have a sign posted at their checkout counter with graphical content that resembles a logo affiliated with a mobile payment service followed by the seller's payment account number or username. Upon checkout, the individual wishing to purchase the item may scan the sign shown at the seller's checkout counter on the mobile device 100. In accordance with the description above, the digital destination may be determined to be a mobile payment application residing on the individual's device. The action subsystem 190e may launch the mobile payment application on the mobile device 100 and direct the mobile payment application to display a store profile for the seller, where the individual may quickly be able to enter a transaction amount and submit a mobile payment to the seller for the item(s).

In some embodiments, an user may be provided with a receipt from a seller. In order to be discrete, the receipt may only include a multi-part identifier and no transaction specific information as may normally be found on a receipt. For example, the multi-part identifier on the receipt may display "[r]38195810". Upon scanning the multi-part identifier with a camera of the mobile device 100, the digital destination may be determined to be a web page where the full receipt for the transaction can be viewed. The action subsystem 190e may launch a web browser application on the mobile device 100 and direct the web browser application to a web page where the receipt is displayed to the user. For example, the graphical content ("[r]") may be associated with a domain for a receipt tracking service, and the human-recognizable textual content (38195810) may be associated with the receipt number. The web page opened may be, for example, http://trackmyreceipts.com/38195810.

Figure 4C:
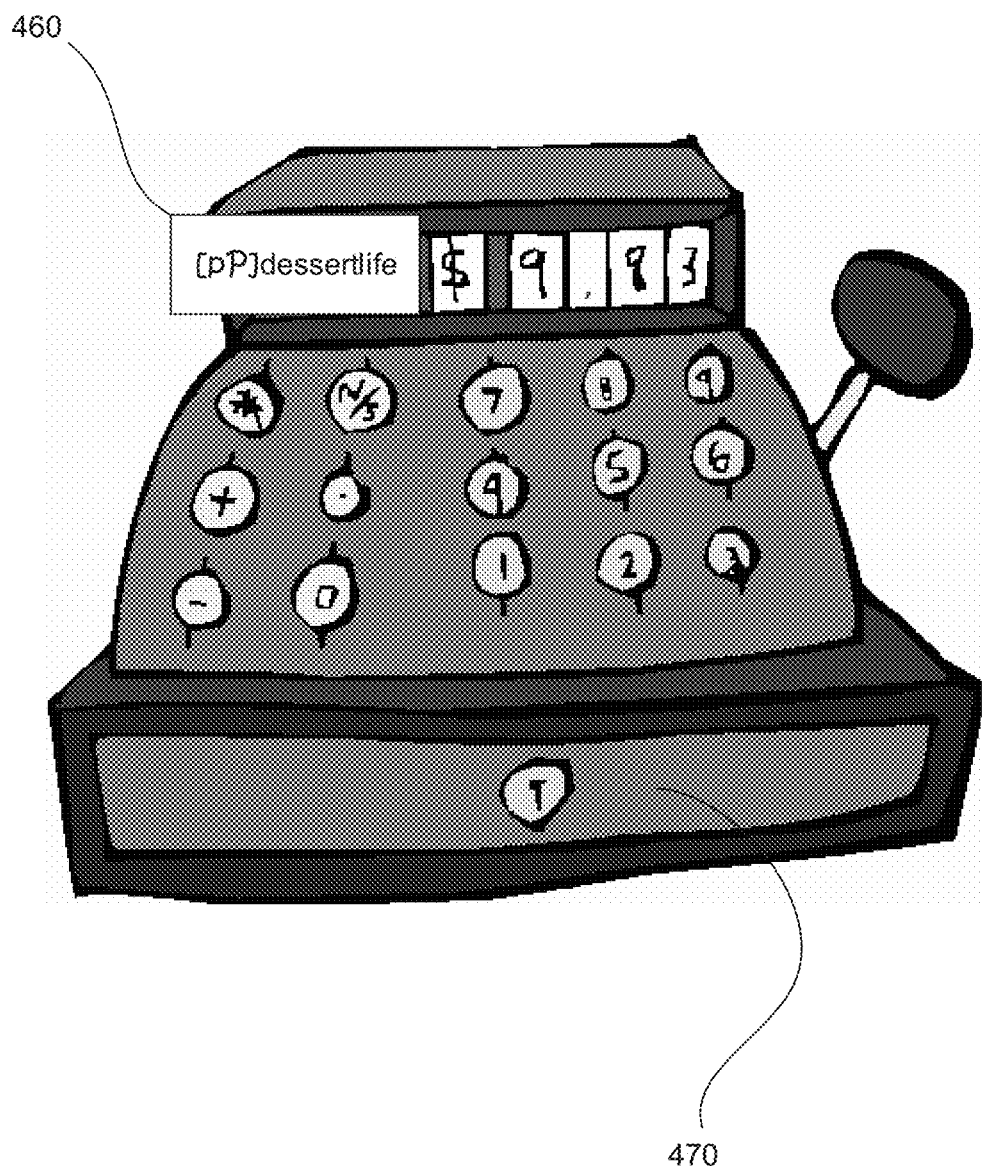
FIG. 4C illustrates a traditional point-of-sale (PoS) terminal with a multi-part identifier affixed thereon, according to some embodiments.
Figure 4D:
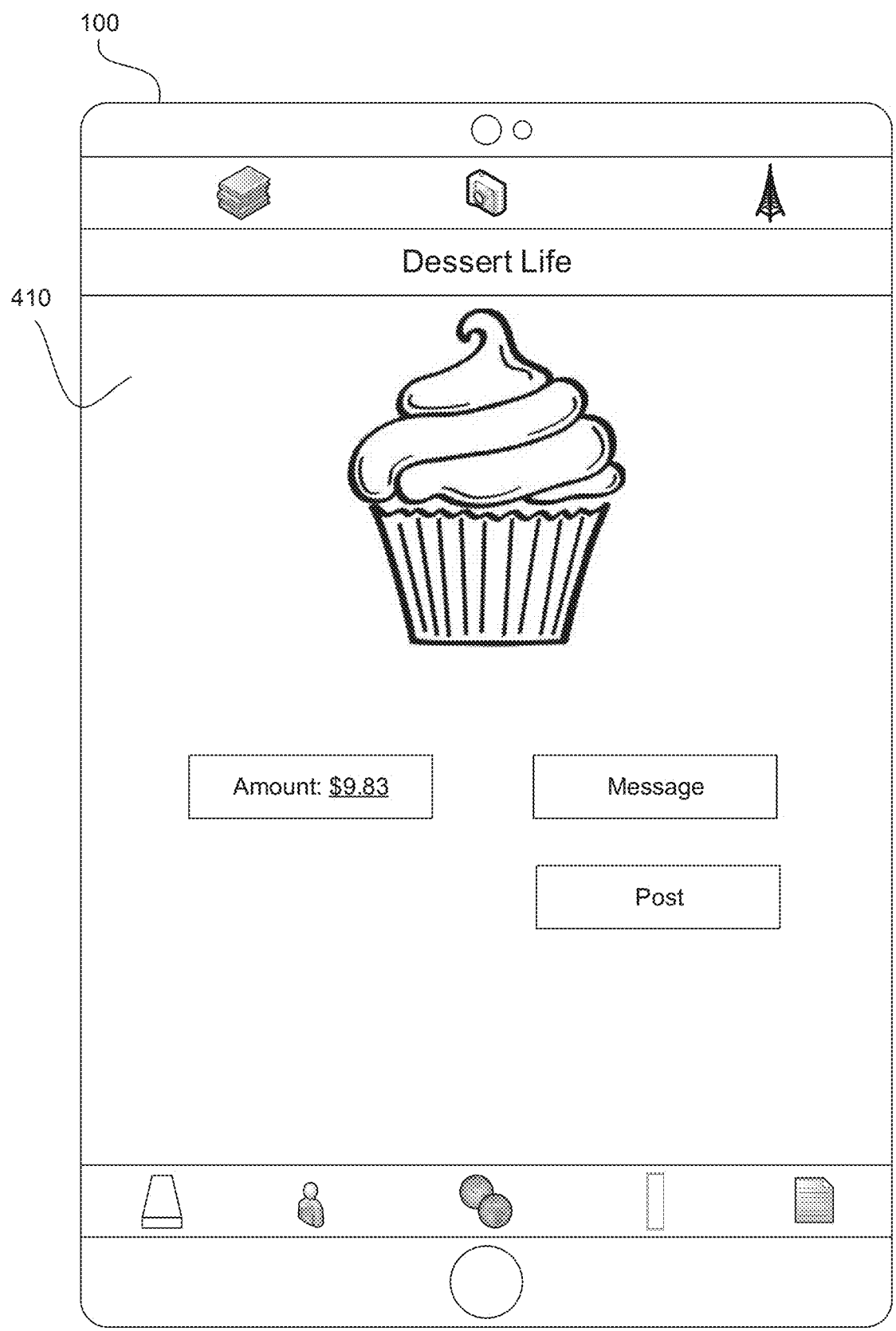
FIG. 4D illustrates a mobile payment application being displayed within a user interface of a display of a mobile device, according to some embodiments.
Figure 4E:
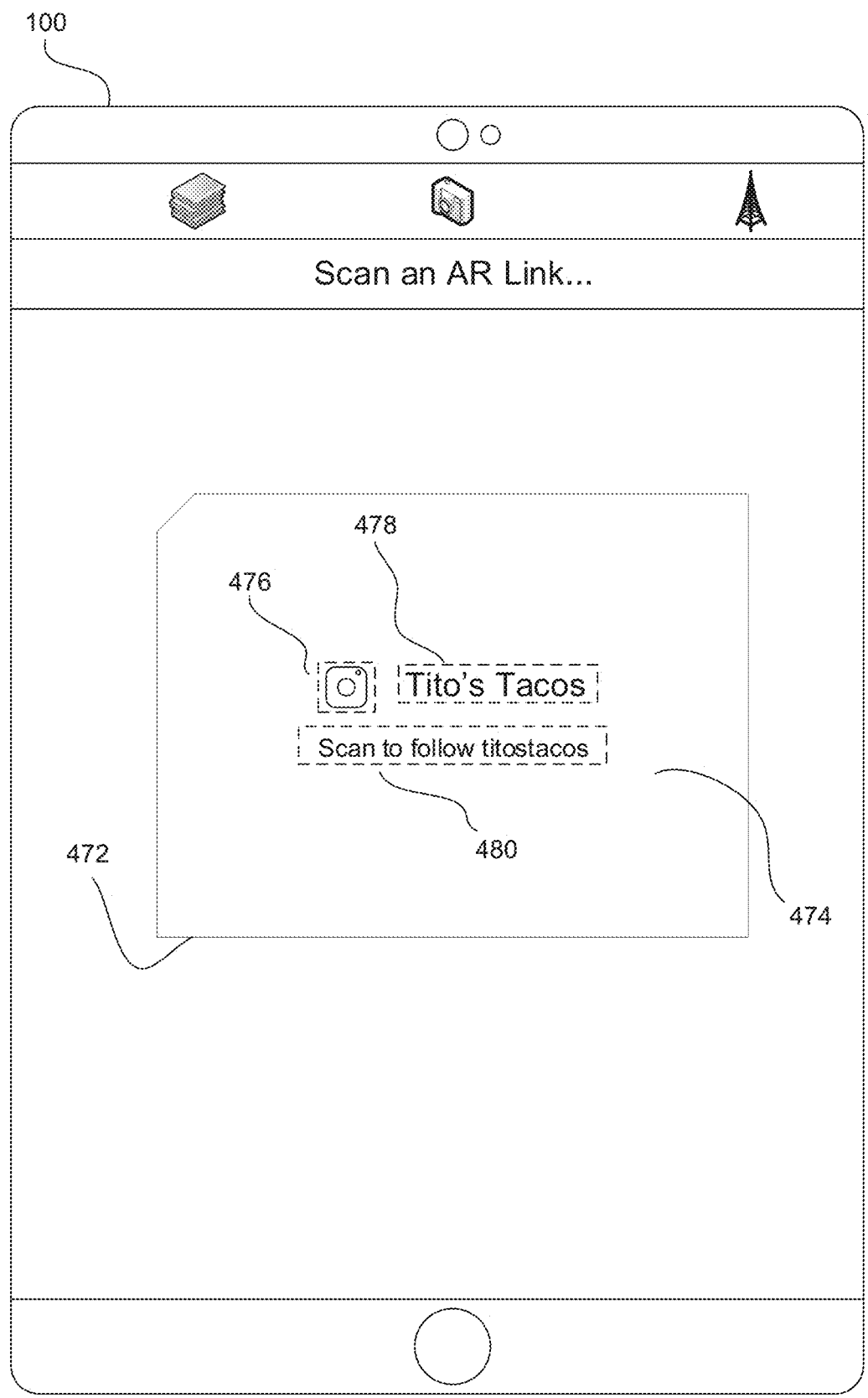
FIG. 4E illustrates an example multi-part identifier, according to some embodiments.
Figure 4F:
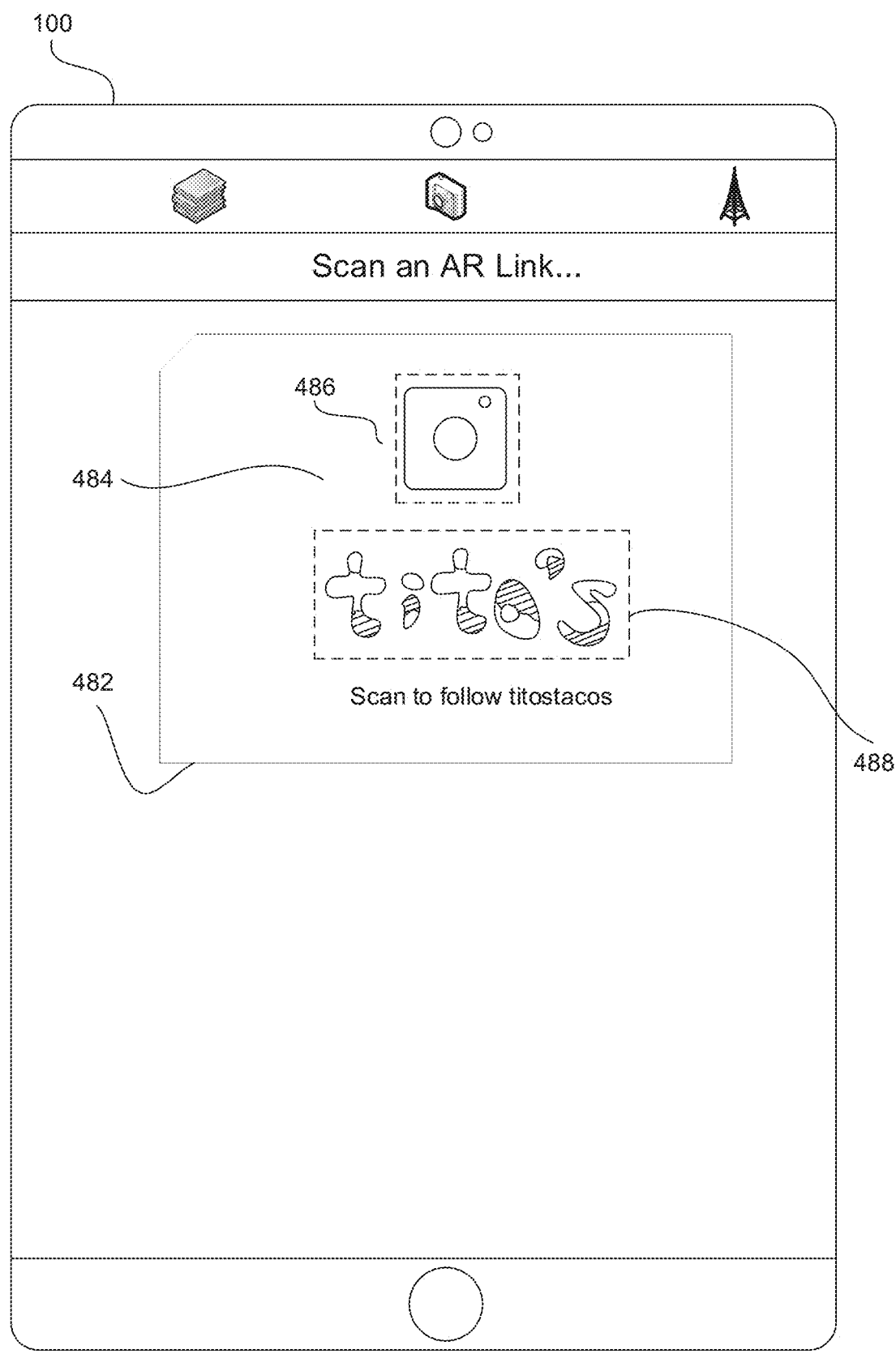
FIG. 4F illustrates another example multi-part identifier, according to some embodiments.

FIG. 4C illustrates a traditional point-of-sale (PoS) terminal with a multi-part identifier affixed thereon, according to some embodiments. The embodiments described herein may also be advantageous for sellers who employ traditional POS terminals that do not accept credit card payments, such as a traditional cash register system 460 depicted in FIG. 5. The seller may affix a sticker 470 having a multi-part identifier displayed thereon to the cash register 460. The multi-part identifier may read "[pP]dessertlife". Upon checkout, a user wishing to purchase goods at this seller may scan the sticker 470 and also capture the cash register 460 in the image frame. In accordance with the description above, upon scanning the sticker 470 and capturing the cash register 460 in the image frame, the digital destination may be determined to be a mobile payment application affiliated with the mobile payment service identified by the logo (e.g., graphical content) "pP". The action subsystem 190e may launch a mobile payment application on the user's mobile device 100 and direct the mobile payment application to a payment page for the seller, identified by textual content "dessertlife". In addition, action subsystem 190e may pre-fill the transaction amount of $9.83 in the payment page for the seller. This may be accomplished by the action subsystem 190e recognizing the characters shown on the display on the cash register 460. As such, the amount of $9.83 may be pre-filled on the seller's payment page and all the user may simply need to do to pay for the goods is hit a payment confirmation button displayed within the mobile payment application to send the payment to the seller. An example of the mobile payment application being displayed within a user interface of a display of the mobile device 100 is shown in FIG. 4D.

FIG. 4E illustrates an image of an object 472 captured using the mobile device 100, according to some embodiments. In this example, the object 472 may be a surface (e.g., poster, sticker, etc.) with a multi-part identifier 474 thereon. The multi-part identifier 474 includes a first portion 476 including graphical content, a second portion 478 including human-recognizable textual content, and a third portion 480 also including human-recognizable textual content. The first portion 476 includes graphical content in the form of a logo. The logo may be a logo associated with a social network service. The second portion 478 includes human-recognizable textual content that identifies an entity "Tito's Tacos". The entity "Tito's Tacos" may reference a page that is published and accessible through the social network service. In various embodiments, the first portion 476 and the second portion 478 of the multi-part identifier 474 can be used to determine a digital destination. For example, the first portion 476 and the second portion 478 can be used to determine a page associated with the entity "Tito's Tacos" within the social network service. In some embodiments, the third portion 480 of the multi-part identifier 474 can be used to determine any actions to be performed in relation to the entity (Tito's Tacos) identified by the second portion 478 of the multi-part identifier 474. In the example of FIG. 4E, the third portion 480 indicates that a user can scan the multi-part identifier 474 to follow the entity "Tito's Tacos" through the social network service. For example, when a user operating the mobile device 100 scans the multi-part identifier 474, the mobile device 100 can launch a software application (e.g., social networking application) to access the social network service through the user's social network service account. The software application can then perform operations so that the user's social network service account follows the entity "Tito's Tacos" through the social network service. Many variations are possible with respect to the types of actions that can be performed.

FIG. 4F illustrates an image of an object 482 captured using the mobile device 100, according to some embodiments. In this example, the object 482 may be a surface (e.g., poster, sticker, etc.) that includes a multi-part identifier 484. In some embodiments, the multi-part identifier 484 can include a first portion 486 and a second portion 488. The first portion 486 corresponds to graphical content that identifies a site or domain (e.g., social network service). The second portion 488 includes human-recognizable textual content corresponding to an entity (e.g., a user, a page, etc.). The textual content corresponding to the second portion 488 (e.g., "tito's") includes color patterns that encode information for interacting with the entity. For example, in various embodiments, textual content can be presented in a certain color pattern to cause pre-defined actions (or operations) to be performed when scanned using a computing device. In this example, the color pattern corresponding to the second portion 488 encodes information that allows users to follow the entity when the multi-part identifier 484 is scanned. For example, a user operating a computing device can scan the multi-part identifier 484. When scanned, the computing device can launch a software application for accessing the social network service referenced by the first portion 486 of the multi-part identifier 484. The software application can determine any actions (or operations) that are associated with the color pattern applied to the second portion 488 of the multi-part identifier 484. In this example, the software application can determine that the applied color pattern is associated with a pre-defined action to follow the entity. Accordingly, the software application can perform the pre-defined action so that the entity is followed by an account associated with the user in the social network service. Many variations are possible.

Figure 5:
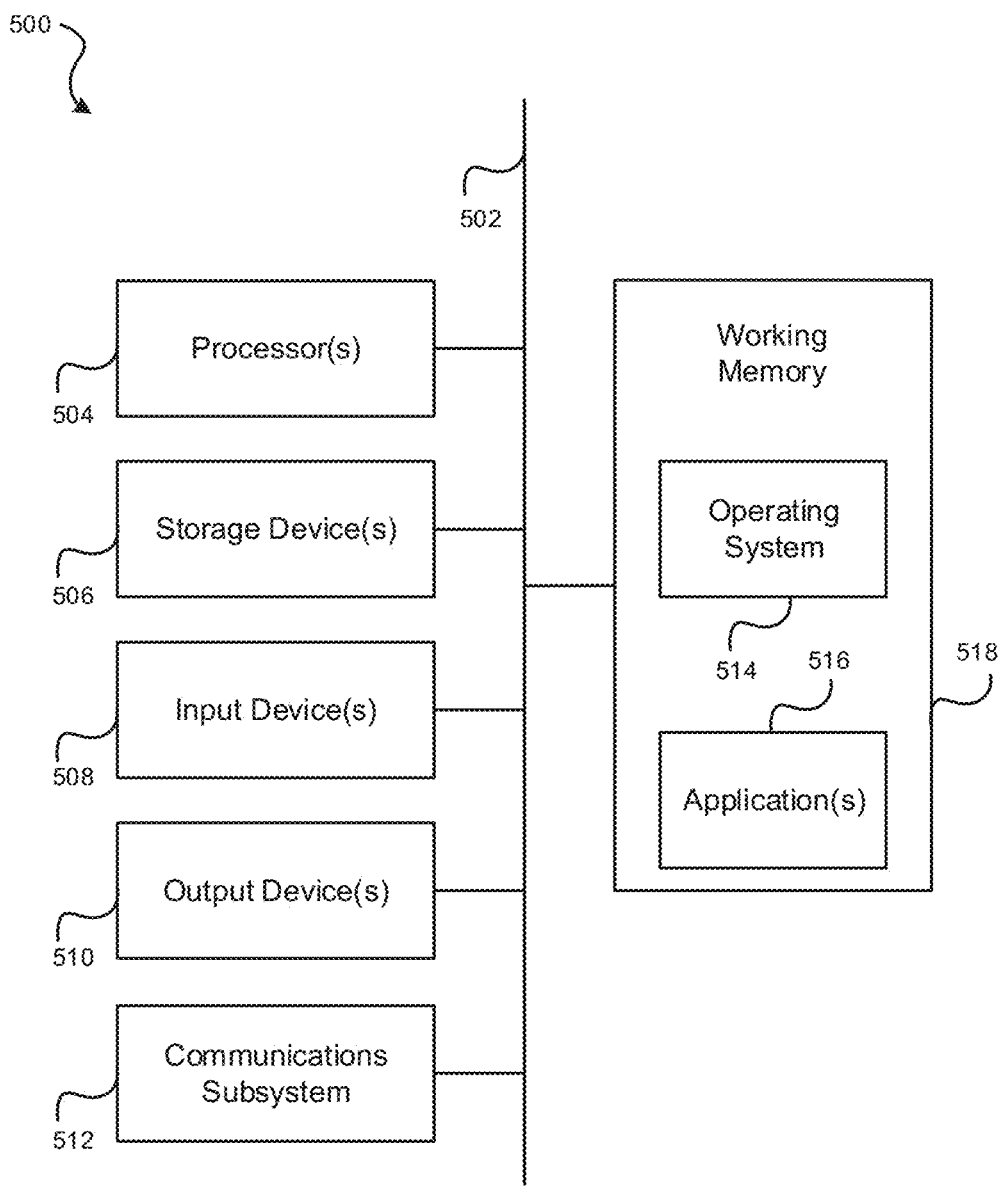
FIG. 5 illustrates an example of a computing system in which one or more embodiments may be implemented.

FIG. 5 illustrates an example of a computing system in which one or more embodiments may be implemented. A computer system as illustrated in FIG. 5 may be incorporated as part of the above described computerized device. For example, computer system 500 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 5 provides a schematic illustration of one embodiment of a computer system 500 that can perform the methods provided by various other embodiments, as described herein, and/or can function as the host computer system, a remote kiosk/terminal, a point-of-sale device, a telephonic or navigation or multimedia interface in an automobile, a computing device, a set-top box, a table computer and/or a computer system. FIG. 5 is meant only to provide a generalized illustration of various components, any or all of which may be utilized as appropriate. FIG. 5, therefore, broadly illustrates how individual system elements may be implemented in a relatively separated or relatively more integrated manner. In some embodiments, elements computer system 500 may be used to implement functionality of the mobile device 100 in FIG. 1.

The computer system 500 is shown comprising hardware elements that can be electrically coupled via a bus 502 (or may otherwise be in communication, as appropriate). The hardware elements may include one or more processors 504, including without limitation one or more general-purpose processors and/or one or more special-purpose processors (such as digital signal processing chips, graphics acceleration processors, and/or the like); one or more input devices 508, which can include without limitation one or more cameras, sensors, a mouse, a keyboard, a microphone configured to detect ultrasound or other sounds, and/or the like; and one or more output devices 510, which can include without limitation a display unit such as the device used in embodiments of the invention, a printer and/or the like.

In some implementations of the embodiments of the invention, various input devices 508 and output devices 510 may be embedded into interfaces such as display devices, tables, floors, walls, and window screens. Furthermore, input devices 508 and output devices 510 coupled to the processors may form multi-dimensional tracking systems.

The computer system 500 may further include (and/or be in communication with) one or more non-transitory storage devices 506, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 500 might also include a communications subsystem 512, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 512 may permit data to be exchanged with a network, other computer systems, and/or any other devices described herein. In many embodiments, the computer system 500 will further comprise a non-transitory working memory 518, which can include a RAM or ROM device, as described above.

The computer system 500 also can comprise software elements, shown as being currently located within the working memory 518, including an operating system 514, device drivers, executable libraries, and/or other code, such as one or more application programs 516, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 506 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 500 may be omitted or may be implemented separate from the illustrated system. For example, the processor 504 and/or other elements may be implemented separate from the input device 508. In one embodiment, the processor is configured to receive images from one or more cameras that are separately implemented. In some embodiments, elements in addition to those illustrated in FIG. 5 may be included in the computer system 500.

Some embodiments may employ a computer system (such as the computer system 500) to perform methods in accordance with the disclosure. For example, some or all of the procedures of the described methods may be performed by the computer system 500 in response to processor 504 executing one or more sequences of one or more instructions (which might be incorporated into the operating system 514 and/or other code, such as an application program 516) contained in the working memory 518. Such instructions may be read into the working memory 518 from another computer-readable medium, such as one or more of the storage device(s) 506. Merely by way of example, execution of the sequences of instructions contained in the working memory 518 might cause the processor(s) 504 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 500, various computer-readable media might be involved in providing instructions/code to processor(s) 504 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 506. Volatile media include, without limitation, dynamic memory, such as the working memory 518. Transmission media include, without limitation, coaxial cables, copper wire and fiber optics, including the wires that comprise the bus 502, as well as the various components of the communications subsystem 512 (and/or the media by which the communications subsystem 512 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 504 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 512 (and/or components thereof) generally will receive the signals, and the bus 502 then might carry the signals (and/or the data, instructions, etc. carried by the signals) to the working memory 518, from which the processor(s) 504 retrieves and executes the instructions. The instructions received by the working memory 518 may optionally be stored on a non-transitory storage device 506 either before or after execution by the processor(s) 504.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium.

Processors may perform the associated tasks. Thus, in the description above, functions or methods that are described as being performed by the computer system may be performed by a processor—for example, the processor 504—configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A computer-implemented method, comprising:
   determining, by a computing device, a multi-part identifier captured using one or more cameras, the multi-part identifier including at least a first portion that references a site, a second portion that references an entity, and information describing one or more actions;
   determining, by the computing device, a digital destination associated with the multi-part identifier based at least in part on the first portion and the second portion of the multi-part identifier; and
   determining, by the computing device, one or more actions to be performed in relation to the digital destination based at least in part on the information included with the multi-part identifier.

2. The computer-implemented method of claim 1, wherein the entity corresponds to a user of a social network service, a page accessible through the social network service, or content published through the social network service.

3. The computer-implemented method of claim 1, wherein determining the one or more actions to be performed in relation to the digital destination based at least in part on the information included with the multi-part identifier further comprises:
   determining, by the computing device, a third portion of the multi-part identifier, the third portion identifying the one or more actions to be performed.

4. The computer-implemented method of claim 1, wherein determining the one or more actions to be performed in relation to the digital destination based at least in part on the information included with the multi-part identifier further comprises:
   determining, by the computing device, a color pattern applied to the second portion of the multi-part identifier, wherein the particular color pattern is associated with one or more actions.

5. The computer-implemented method of claim 1, wherein the one or more actions include at least one of: following the entity through a social network service, adding the entity as a friend through the social network service, messaging the entity through the social network service, liking the entity through the social network service, posting a comment through the social network service, and sharing content through the social network service.

6. The computer-implemented method of claim 1, wherein determining the digital destination further comprises:

determining, by the computing device, the site based at least in part on the first portion of the multi-part identifier; and determining, by the computing device, the entity based at least in part on the second portion of the multi-part identifier.

7. The computer-implemented method of claim 1, wherein the first portion of the multi-part identifier corresponds to graphical content.

8. The computer-implemented method of claim 1, wherein the second portion of the multi-part identifier corresponds to human-recognizable textual content.

9. The computer-implemented method of claim 1, wherein a username associated with the entity is split into at least a first part and a second part, and wherein the split username is provided in the second portion of the multi-part identifier.

10. The computer-implemented method of claim 9, wherein the username is split based on one or more rules for presenting human-recognizable usernames.

11. A system comprising:
at least one processor; and
a memory storing instructions that, when executed by the at least one processor, cause the system to perform:
determining a multi-part identifier captured using one or more cameras, the multi-part identifier including at least a first portion that references a site, a second portion that references an entity, and information describing one or more actions;
determining a digital destination associated with the multi-part identifier based at least in part on the first portion and the second portion of the multi-part identifier; and
determining one or more actions to be performed in relation to the digital destination based at least in part on the information included with the multi-part identifier.

12. The system of claim 11, wherein the entity corresponds to a user of a social network service, a page accessible through the social network service, or content published through the social network service.

13. The system of claim 11, wherein determining the one or more actions to be performed in relation to the digital destination based at least in part on the information included with the multi-part identifier further causes the system to perform:
determining, by the computing device, a third portion of the multi-part identifier, the third portion identifying the one or more actions to be performed.

14. The system of claim 11, wherein determining the one or more actions to be performed in relation to the digital destination based at least in part on the information included with the multi-part identifier further causes the system to perform:
determining, by the computing device, a color pattern applied to the second portion of the multi-part identifier, wherein the particular color pattern is associated with one or more actions.

15. The system of claim 11, wherein the one or more actions include at least one of: following the entity through a social network service, adding the entity as a friend through the social network service, messaging the entity through the social network service, liking the entity through the social network service, posting a comment through the social network service, and sharing content through the social network service.

16. A non-transitory computer-readable storage medium including instructions that, when executed by at least one processor of a computing system, cause the computing system to perform a method comprising:
determining a multi-part identifier captured using one or more cameras, the multi-part identifier including at least a first portion that references a site, a second portion that references an entity, and information describing one or more actions;
determining a digital destination associated with the multi-part identifier based at least in part on the first portion and the second portion of the multi-part identifier; and
determining one or more actions to be performed in relation to the digital destination based at least in part on the information included with the multi-part identifier.

17. The non-transitory computer-readable storage medium of claim 16, wherein the entity corresponds to a user of a social network service, a page accessible through the social network service, or content published through the social network service.

18. The non-transitory computer-readable storage medium of claim 16, wherein determining the one or more actions to be performed in relation to the digital destination based at least in part on the information included with the multi-part identifier further causes the computing system to perform:
determining, by the computing device, a third portion of the multi-part identifier, the third portion identifying the one or more actions to be performed.

19. The non-transitory computer-readable storage medium of claim 16, wherein determining the one or more actions to be performed in relation to the digital destination based at least in part on the information included with the multi-part identifier further causes the computing system to perform:
determining, by the computing device, a color pattern applied to the second portion of the multi-part identifier, wherein the particular color pattern is associated with one or more actions.

20. The non-transitory computer-readable storage medium of claim 16, wherein the one or more actions include at least one of: following the entity through a social network service, adding the entity as a friend through the social network service, messaging the entity through the social network service, liking the entity through the social network service, posting a comment through the social network service, and sharing content through the social network service.

* * * * *